(12) United States Patent
Buchkremer et al.

(10) Patent No.: US 8,710,997 B2
(45) Date of Patent: Apr. 29, 2014

(54) METHOD AND DEVICE FOR THE DETECTION OF DEFECTS OR CORRECTION OF DEFECTS IN MACHINES

(75) Inventors: Wolfgang Buchkremer, Grevenbroich (DE); Wilfried Ehmer, Dortmund (DE)

(73) Assignee: KHS GmbH, Dortmund (DE)

( * ) Notice: Subject to any disclaimer, the term of this patent is extended or adjusted under 35 U.S.C. 154(b) by 557 days.

(21) Appl. No.: 12/999,541

(22) PCT Filed: Jun. 27, 2009

(86) PCT No.: PCT/EP2009/004658
§ 371 (c)(1),
(2), (4) Date: Dec. 16, 2010

(87) PCT Pub. No.: WO2010/009797
PCT Pub. Date: Jan. 28, 2010

(65) Prior Publication Data
US 2011/0102186 A1  May 5, 2011

(30) Foreign Application Priority Data

Jul. 25, 2008 (DE) .................. 10 2008 035 005

(51) Int. Cl.
*G08B 21/00* (2006.01)
(52) U.S. Cl.
USPC ........ 340/679; 340/500; 382/145; 356/237.1; 372/9
(58) Field of Classification Search
USPC .......... 340/500, 501, 502, 679; 382/149, 145, 382/141; 356/237.1, 237.4, 237.3, 237.5, 356/237.6; 372/9, 10
See application file for complete search history.

(56) References Cited

U.S. PATENT DOCUMENTS

| 5,177,559 | A  | * | 1/1993  | Batchelder et al. ........ | 356/237.5 |
| 5,623,341 | A  | * | 4/1997  | Hunt ............................ | 356/300   |
| 6,246,706 | B1 | * | 6/2001  | Kafka et al. .................. | 372/24    |
| 6,373,565 | B1 | * | 4/2002  | Kafka et al. ................. | 356/237.4 |
| 7,433,031 | B2 | * | 10/2008 | Xu et al. ..................... | 356/237.2 |
| 7,589,833 | B2 | * | 9/2009  | Bamba et al. ............... | 356/237.2 |
| 2005/0094136 | A1 |  | 5/2005  | Xu | |

FOREIGN PATENT DOCUMENTS

| DE | 22 15 582 | 3/1972 |
| DE | 27 17 375 | 4/1977 |
| DE | 42 40 628 | 6/1994 |

* cited by examiner

*Primary Examiner* — George Bugg
*Assistant Examiner* — Edny Labbees
(74) *Attorney, Agent, or Firm* — Occhiuti & Rohlicek LLP

(57) ABSTRACT

The present invention relates to a method and device for the detection or correction of defects in machines, whereby a defect is optically and/or acoustically displayed at its point of origin and/or correction by means of at least one reporting device (5). According to the invention, the reporting device (5) is arranged independently from the location and is preferably centrally arranged. Furthermore, the reporting device (5) marks the point of origin and/or correction of the defect remotely and both in an optical and/or acoustical manner.

20 Claims, No Drawings

METHOD AND DEVICE FOR THE DETECTION OF DEFECTS OR CORRECTION OF DEFECTS IN MACHINES

CROSS-REFERENCE TO RELATED APPLICATIONS

This application is the National Stage of International Application No. PCT/EP2009/004658, filed on Jun. 27, 2009, which claims the benefit of the priority date of German Application Serial No. 10 2008 035 005.2, filed on Jul. 25, 2008. The contents of both of the foregoing applications are hereby incorporated by reference in their entirety.

The invention concerns a method and a device for the detection or correction of defects in machines, whereby a defect is optically and/or acoustically displayed at its point of origin and/or correction by means of at least one reporting device.

In the state of the art, for example in textile machines, it is known from DE 22 15 582 or again DE 42 40 628 A1, that when a defect arises, it can be made optically transparent with the aid of an indicator light. This facilitates the detection and in some cases the correction of the defect for the monitoring personnel.

Independently thereof, DE 27 17 375 describes a circuit arrangement for the detection of program or hardware defects which works with a bank of lamps. The occurrence of a defect leads to a special display program on the bank of lamps.

The known methods are not completely convincing. This is because, from the point of view of defect detection, they are rigid and inflexible. This is fundamentally due to the fact that the indicator lights only reflect certain defect displays and/or must be present at the point of origin of the defect. The methods in practical use to date are also in need of improvement with respect to their ease of use. This is because the operating personnel are usually only alerted to a defect by the fact that a defect message is given, for example by data transfer to a handheld device. Although this does basically inform the operating personnel about the defect, it says nothing about the point of origin of the defect or its possible correction.

This is especially disadvantageous in the case of discharging machines or production lines, in which, in principle, automatically-working devices only have to be operated or serviced for brief periods, so there are no personnel permanently nearby, or one operator has to monitor several locations at the same time. This is the case, for example, in the beverage industry. This is because here, a defect or any problem in general can only be corrected at a specific spot. With the transmission of information in prior use, however, the detection of a defect and also the correction of a defect is extremely time-consuming. Major problems arise when poorly-qualified personnel have to operate the machine. This is where the invention will provide a complete remedy.

The invention is based on the technical problem of specifying a method and a device for the detection or correction of defects in machines, with the aid of which the defect can be corrected in a short time and especially effectively.

In order to solve this technical problem, a generic method for the detection or correction of defects is characterised in that the reporting device is arranged independently of the point (point of origin and/or point of correction) and also preferably centrally and remotely marks the point of origin and/or correction optically and/or acoustically.

Contrary to the category-forming state of the art, the invention thus usually works with a reporting device arranged centrally with respect to the machine which is to be monitored, i.e. one which is arranged independently of the point of origin (and/or point of correction) of the defect and having a greater or lesser distance from the point of origin (point of correction). For this reason, the point of origin of the defect is remotely optically and/or acoustically marked. A similar procedure may be followed with the point of correction.

In this case, the point of origin identifies the point at which one or more defects occur. The point of correction, however, is the point at which the defect concerned is corrected, or has to be corrected. Obviously, it is also possible for there to be several points of correction for one and the same defect and these are covered by the invention.

Usually the point of origin and the point of correction coincide, but this is not necessarily the case. In either case, it is possible by using the invention and the reporting device to mark optically either the point of origin, the point of correction or both remotely. Acoustic marking is also possible. Optical and acoustic marking are covered equally well by the invention.

Optical marking normally takes place in such a way that the reporting device is equipped with or coincides with at least one light source and the light source highlights the point of origin and/or the point of correction optically with respect to the other components of the machine. This can occur simply by shining a light on the point concerned. It is equally possible for the light source to be injected into a transparent machine part or enclosure part at the point to be marked and for example to cause this to illuminate. In any case, the optically-operating reporting device ensures that the point of origin and/or point of correction is optically highlighted against the other components of the machine.

In the case of an acoustic marking of the point concerned, the procedure is that the point is caused, for example, to vibrate. To this end, the reporting device may be equipped with a directional loudspeaker or equivalent acoustic source. Other acoustic transmission devices are also possible, provided it is guaranteed that the machine, at the point of origin and/or point of correction of the detected defect, has an acoustic anomaly in comparison with the other machine components. This can in general be a vibration of the associated machine component or this is used for sound reverberation.

In any case, it must be ensured that a user recognises beyond any doubt the acoustic and/or optical marking of the point of origin and/or point of correction of the defect concerned. To this end, an optically-operating reporting device works, as a rule, in the visible spectral range in which the light source emits. In exactly the same way, the acoustic reporting device must be designed so that the machine element to be marked vibrates or reflects sound in a range audible to humans. In order to further simplify detection at this point, the reporting device preferably works with a modulation in its optical and/or acoustic marking. This modulation can be used to make the optical and/or acoustic marking easier to filter out from ambient light or ambient noise for a user.

Furthermore, optical and/or acoustic modulation can be used when marking the point of origin and/or point of correction to transmit, for example, different types of defect, varying severities of defect etc., in addition to perfect point localisation. This means that the user not only receives, via the modulation of the reporting device, a message that a defect has occurred, and where (point of origin of the defect) and where this may be corrected (point of correction of the defect), but information can also be processed about the fact that the modulation of the reporting device gives information about the defect which occurs.

In the case of different types of defect, there can for example be defects which are caused by an electric or hydraulic problem or purely and simply due to the failure of consumables. The various severities of defect convey information as to whether for example the machine, after restocking of consumables, can continue to operate, up to a serious problem requiring immediate shut-down. In each case, by using the modulation of the reporting device, not only is there perfect point localisation against ambient light and/or ambient noise, but the user is also informed about the nature and the severity of the defect.

To this end, the defect which occurs at the point of origin can be detected and analysed in detail in the first instance by a control unit. It is also possible for the control unit to evaluate the defect which occurs with respect to its relevance. As a function of this collected data, the reporting device is then controlled and, if necessary, modulated. Depending on the defect occurring and identified, the reporting device is then acted upon by the control unit in such a way that the point of origin and if applicable the point of correction are given a marking. This marking can then—as described—be flanked with a modulation, in order to deliver more detailed information about the nature and severity of the defect to a user.

In detail, the optical modulation of the reporting device can be effected in such a way that the colour and/or the image and/or the beam direction and/or the luminous pattern of the light source concerned are modulated. A colour modulation can in the simplest case be carried out in such a way that a white light source is flanked with various filters. Alternatively, however, it is also possible to work from the start with light sources of different colours, for example with light-emitting diodes or colour lasers.

Insofar as the image of the light source undergoes a modulation, this means that the optical element imaging the light source on the point (point of origin and/or point of correction) works with, for example, different enlargements depending on the modulation. In the simplest case, the size of a point of light can be varied. In addition, the luminous pattern can also be modulated. This can occur, in the simplest case, in that the light source is altered with respect to its light intensity. In addition, it is however also possible for different patterns of light or luminous patterns to be generated, for example by front-mounted diffusion filters or similar. The beam direction of the light source can also be altered by, for example, the light emitted by the light source being deflected by a movable mirror and/or describing a certain pattern at the desired location. All of these types of modulation can be realised alternatively or jointly, both temporally and spatially.

This can be done especially simply if the light source is designed as, for example, a matrix of light-emitting diodes, which is equipped with various coloured light-emitting diodes and which makes it easy to realise variations in the light patterns, colour, image and also the beam direction, and this applies to both temporal and spatial modulation.

Insofar as the reporting device works with an acoustic modulation, the invention proposes that in this respect a change is made to the beam direction and/or to the frequency spectrum of an acoustic source and/or of the directional loudspeaker. The change in the beam direction in this case means in concrete terms that, for example, the directional loudspeaker used at this point changes the sound waves emitted in the space locally. The frequency spectrum can be simply modulated by the sound waves emitted by said loudspeaker undergoing a change to their frequency. This can in turn all occur taking into account a temporal and/or spatial modulation.

All in all, acoustic and/or optical modulation of the reporting device can also be used not only by the user to derive conclusions from the modulation about the type and severity of a defect etc., but it is also possible for the modulation to give indications to the user on how the respective defect correction should take place. In this case, it is possible for the modulation to proceed according to a specific coding scheme and the coding scheme to correspond to a specific information content. Obviously, a defect code or an indicator to the point of origin of the defect and/or its point of correction can also quite simply be projected.

The subject matter of the invention also includes a device especially suitable for the detection and/or correction of defects in machines. This device is especially suitable for carrying out the method described and is referred to in claim 7. Preferred embodiments of this device are the subject matter of claims 8 ff.

As a result, a method and a device are made available with the aid of which a user is easily and reliably informed about the point of origin of a defect and at the same time about its point of correction. In addition, information about correcting the defect and the nature and severity of the defect are transmitted. This all takes place, as a rule, from a reporting device arranged at an exposed spot, which is usually arranged above the machine to be monitored. This reporting device is usually a central light source.

In this way, the user personnel arrives unerringly at the point of origin and/or point of correction of the defect and, because of the additionally transmitted information, can arrange for the defect to be corrected directly. Compared with the previous state of the art, this saves valuable time. This is where the essential advantages can be seen.

The invention will next be explained in more detail on the basis of a drawing showing just one embodiment. The single FIGURE shows a device according to the invention in an overview.

A device is shown for the detection and/or correction of defects in machines. The machine shown is a bottle processing machine, i.e. an installation with which bottles 1 are processed. In the embodiment, and not limitatively, the processing of bottles 1 means cleaning them in a cleaning device 2, the subsequent application of a label in a labelling station 3 and finally filling them with a beverage, for example beer, in the bottles 1 thus prepared in a filling unit 4. In the drawing, said machine components 2, 3, 4 of the bottle processing installation and/or bottle processing machine are shown only in diagram form, because the details of their design are immaterial.

It is of especial importance for the present invention that the machine and/or bottle processing installation shown in the example is equipped with a device for detecting defects. Alternatively, a device for correcting defects may also be provided. As a rule, the device for detection and correction coincide.

A basic part of the construction of the device for the detection and/or correction of defects includes a reporting device 5, with the aid of which a defect is optically and/or acoustically reported at its point of origin and/or point of correction. In the context of the embodiment, only an optical display or marking of the point of origin and/or point of correction of the defect is described. Contrary to the state of the art, said reporting device 5 is arranged independently of the point of origin and/or point of correction of the defect with respect to the machine to be monitored and consequently is also spatially remote from said point of origin and/or point of correction.

In most cases the reporting device 5 is placed centrally with respect to the machine and/or the bottle processing installation in the example, and above the machine and/or bottle processing installation. This results in a problem-free marking of the point of origin and/or point of correction of the defect, and also remotely. To this end, the point of origin and/or point of correction in the example shown is optically marked.

The reporting device 5 has a central light source 5 or several centrally-arranged light sources 5 respectively for this purpose and/or is designed as such. In addition, the reporting device 5 is equipped with beam deflector optics 6, which in this case is illustrated merely in diagram form as a deflecting mirror 6. The deflecting mirror or the beam deflector optics 6 has a servomotor, which, in the same way as the individual machine elements or machine components 2, 3, 4 is connected to a central control unit 10. The same applies for the light source 5, which is a beam light source, i.e. one which emits a light beam in the visible spectrum.

In order to mark the point of origin and/or point of correction of the defect optically, the light source 5 or a light beam 7 leaving the light source 5 is injected into, for example, a transparent machine part of the individual machine elements 2, 3, 4. By injecting this light, the machine part starts to light up, and/or stands out from its background. In general, however, the respective point is purely and simply illuminated by the light beam 7.

In a variant, not shown, light guides are arranged at the edge of transparent machine parts, e.g. safety screens, which are controlled by a control unit 10 and fed from a central or decentralised light source 5. The light guides themselves are housed in a cover strip or frame of the transparent machine part and can [sic][1].

[1] Translator's note: this sentence is incomplete.

Depending on where the point to be illuminated is located, the beam deflector optics 6 and/or the beam deflector 6 in general ensures that this respective point undergoes optical highlighting with respect to the ambient light. Such optical highlighting is especially impressive if the light source 5 is designed as a laser light source 5 and has one or more lasers. In addition, the stationary light source 5 which is arranged above the bottle processing installation is equipped with a filter 8, with the aid of which the colour of the light source can be changed.

This method is especially suitable if a white light source 5 is being used. The filter 8 may be a colour filter wheel, which is equipped with various colour filters which can be pivoted as required in front of the (white) light source 5, so that the colour of the light beam 7 ultimately projected with the aid of the beam deflector 6 onto the point alters in the required fashion.

In addition, the light source 5 may be flanked with a diffusion disc 9, a pattern disc or similar. As a result, the reporting device and/or light source 5 generates a marking pattern at the point of its projection. This may simultaneously be coloured with the aid of the filter 8. —Instead of the light source 5 including colour filter 8 and diffusion disc 9 or marking pattern 9, it is obviously also possible to work with a planar array of colour and white light LEDs in the frame of the reporting device 5. This LED array allows different marking patterns with selectable colours and varying beam direction to be realised without any problem.

The reporting device 5 or the light source 5, the filter 8, the diffusion disc 9 and the beam deflector 6 are all controlled with the aid of the aforementioned control unit 10. This control unit 10 is also connected to the individual machine elements 2, 3, 4, in order to detect any defects which may arise there. In this way, the control unit 10 can control the reporting device 5 according to the point of origin of the defect in order to mark the point of origin. Equally, the control unit 10 is capable of rendering the point of correction of the defect visible with the aid of the reporting device 5.

To this end, the light beam 7 ultimately emitted by the reporting device 5 is deflected onto the respective point, as indicated in diagram form in the single FIGURE by individual light beams 7. In so doing, the respective light beam 7 can be varied with respect to its colour, its marking pattern produced at the respective point, its beam direction and finally with respect to the luminous pattern of the light source 5 generated. To this end, in the simplest case, the light source 5 is modulated with respect to its light intensity with the aid of the control unit 10. In any case, the point (point of origin of the defect and/or point of correction of the defect) can be optically highlighted, at the same time in terms of a temporal and/or spatial modulation of the light beam 7 emitted by the reporting device 5. As a result, a user is comprehensively informed about the defect as such, its point of origin, its point of correction, if any, and the nature and severity of the defect. In addition, the user may also draw conclusions from the information transmitted about the correction of the defect, as was described in the introduction.

The invention claimed is:

1. A method for the detection and/or correction of defects in machines, said method comprising: monitoring operation of a machine, and, when a defect arises in the machine, providing information to be used for correcting the defect, wherein providing the information comprises, using at least one reporting device arranged independently of a point of origin and/or correction of the defect, displaying, optically and/or acoustically, said point of origin and/or correction by using said at least one reporting device to mark the point remotely in an optical and/or acoustical manner.

2. The method of claim 1, wherein the reporting device marks the point optically and/or acoustically with a modulation for a purpose selected from a group consisting of: indicating different types of defect, indicating different severities of defect, guaranteeing perfect point localization against ambient light, and guaranteeing perfect point localization against ambient noise.

3. The method of claim 1, wherein the defect occurring at the point is detected, analyzed and evaluated according to its relevance by a control unit, and wherein the reporting device is controlled and modulated based on said relevance.

4. The method of claim 1, further comprising optically modulating the reporting device to cause temporal and/or spatial modulation of any one or more characteristics of a light source, said characteristics selected from a group consisting of: color, image, beam direction, and luminous pattern.

5. The method of claim 1, further comprising acoustically modulating the reporting device to cause temporal and/or spatial modulation of one of a beam direction and a frequency spectrum of an acoustic source.

6. The method of claim 1, further comprising acoustically and/or optically modulating the reporting device in such a way that conclusions about the defect correction can be drawn from the modulation.

7. An apparatus for the detection and/or correction of defects in machines that are being monitored, said apparatus comprising: a reporting device that, when a defect arises in a machine, provides information to be used in correcting said defect, said reporting device being configured to optically and/or acoustically display a point of origin and/or point of correction of said defect, wherein said reporting device is arranged independently of the point, and wherein said reporting device displays said point of origin and/or point of correction by marking the point of origin and/or point of correction optically and/or acoustically.

8. The apparatus of claim 7, wherein the reporting device comprises a light source that is central relative to a plurality of machines being monitored.

9. The apparatus of claim 8, wherein the light source at the point of origin and/or correction of the defect is configured to inject light into a transparent machine part.

10. The apparatus of claim 7, wherein the reporting device is stationary and arranged above the machine.

11. The apparatus of claim 7, wherein the light source can be dynamically directed or deflected.

12. The apparatus of claim 7, wherein the light source is equipped with a beam deflector.

13. The apparatus of claim 7, wherein the light source is motor-driven and pivotably supported about at least one axis.

14. The apparatus of claim 7, wherein the light source generates a straight light beamto.

15. The apparatus of claim 7, further comprising a filter assigned to the light source to change the color of light provided by the light source.

16. The apparatus of claim 7, wherein the machine and the reporting device are connected to a control unit, wherein said control unit controls the reporting device depending on the point of origin of the defect in order to mark the point of origin and/or correction.

17. The apparatus of claim 7, wherein the reporting device generates a marking pattern at the point of origin and/or correction of the defect, said marking pattern varying temporally and/or spatially.

18. The apparatus of claim 7, wherein the reporting device comprises at least one light guide or light emitting diode that directly abuts on a transparent machine part or lies opposite thereto, while the reporting device is controlled by a control unit.

19. The apparatus of claim 18, wherein said light guide or light-emitting diode is arranged in a strip or in a frame directly abutting on the transparent machine part.

20. The apparatus of claim 7, wherein said reporting device is arranged centrally with respect to said machines to be monitored.

* * * * *